(12) United States Patent
Daily et al.

(10) Patent No.: US 7,445,508 B2
(45) Date of Patent: *Nov. 4, 2008

(54) CONNECTOR SYSTEM FOR SOLAR CELL ROOFING TILES

(75) Inventors: Christopher George Daily, Harrisburg, PA (US); Scott Stephen Duesterhoeft, Etters, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,388

(22) Filed: Oct. 31, 2007

(65) Prior Publication Data

US 2008/0160819 A1 Jul. 3, 2008

Related U.S. Application Data

(63) Continuation of application No. 11/619,472, filed on Jan. 3, 2007.

(51) Int. Cl.
*H01R 13/66* (2006.01)

(52) U.S. Cl. ............................ 439/620.22; 439/620.21; 439/281; 439/282; 439/357

(58) Field of Classification Search ................. 439/281, 439/282, 620.21, 620.22, 487, 357
See application file for complete search history.

*Primary Examiner*—Renee S Luebke
*Assistant Examiner*—Harshad C Patel

(57) ABSTRACT

A connector system for photovoltaic roof tiles has a body and a plug assembly with latching means. The body portion has a latching member and a rib defining a recess for mating with the plug assembly. A pair of cavities extends inwardly from the recess. The latching member has a projection, and integral conductors are formed within the body portion. The plug assembly has an indentation for retentively receiving the projection, and an indentation for receiving the rib. A pair of protrusions extends from a peripheral end of the plug assembly and receives a cable terminal of the plug assembly. The protrusions engage with and seal off the cavities to form an electrically conductive path with the cable terminals when the body and the plug mate. The latching projection retentively engages the plug. The plug assembly disengages by manipulation of the latching member projection member.

20 Claims, 7 Drawing Sheets

CONNECTOR SYSTEM FOR SOLAR CELL ROOFING TILES

This patent application is a continuation of U.S. Utility application Ser. No. 11/619,472, filed on Jan. 3, 2007, entitled "Connector System for Solar Cell Roofing Tiles", the disclosure of which is incorporated as if fully rewritten herein.

FIELD OF THE INVENTION

The present invention is directed to an electrical interconnection system, and more particularly to an electrical interconnection system for photovoltaic energy arrays installed in roof tile systems.

BACKGROUND OF THE INVENTION

Photovoltaic (PV) modules or arrays produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV system special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected and placed between a polyvinyl plate on the bottom and a tempered glass on the top. PV cells are interconnected with thin contacts on the upper side of the semiconductor material. The typical crystalline modules power ranges from several W to up to 200 W/module.

In the case of facade or roof systems the photovoltaic system may be installed during construction, or added to the building after it is built. Roof systems are generally lower powered systems, e.g., 10 kW, to meet typical residential loads. Roof integrated photovoltaic systems may consist of different module types, such as crystalline and micro-perforated amorphous modules. A portion of natural sunlight is transferred into the building through the modules. Roof-integrated photovoltaic systems are integrated into the roof; such that the entire roof or a portion thereof is covered with photovoltaic modules, or they are added to the roof later. PV cells may be integrated with roof tiles.

PV modules/arrays require specially designed devices adapted for interconnecting the various PV modules/arrays with each other, and with electrical power distribution systems. PV connection systems are used to accommodate serial and parallel connection of PV arrays. In addition to junction boxes, a PV connection system includes connectors that allow for speedy field installation or high-speed manufacture of made-to-length cable assemblies.

Existing PV roofing tiles employ electrical connector systems that require a custom designed tool for making terminations. The tool resembles a screw driver or a wrench with end furcations that mate with slots in the connector body. When engaged in the connector body slots, the wire connection is locked or unlocked inside the connector by pivoting or rotating the tool to selectively align the slots with the open or closed position. However, in addition to the inconvenience of requiring a roof installer to carry an expensive extra tool, these furcated members tend to break in the field because of the relatively low force required to snap them off when torque is applied. Also, there is a tendency for the tool to misalign with the connector when the conductors that are inserted into the connector body are pre-tinned. Therefore there is a need for an electrical interconnection system for PV roof tiles that provides a solid, reliable electromechanical connection between the roof tile and the cable conductors.

SUMMARY OF THE INVENTION

The present invention is directed to an electrical connector system for a PV array with a roof tile system. The connector system includes a body portion and a plug assembly. The body portion and plug assembly are latchingly engageable. The body portion has a latching member, an end portion and a recess open at one end. A pair of cavities extends inwardly from the peripheral end. Both of the cavities are configured to receive a conductor portion. An edge connector portion is positioned along a portion of the body portion. The latching member extends outwardly from an edge of the body portion and retentively engages the plug assembly. Each plug assembly includes a first indentation for receiving body portion, and a second indentation for receiving the rib portion. The plug assemblies also each include a pair of protrusions that are configured to receive an end terminal of a cable that traverses the plug assembly. The pair of protrusions are configured to engage the pair of cavities in a connection. Each of the cables forms an electrical connection with the associated cable conductor end terminals when the body portion and the rib portion mate. The latching member is retentively engaged within the first indentation.

The present invention is directed to an electrical connector system for a PV array with a roof tile system. The connector system includes a body portion and a plug assembly. The body portion and plug assembly are latchingly engageable. The body portion has a latching member, an end portion and a recess open at one end. A pair of cavities extends inwardly from the peripheral end. Both of the cavities are configured to receive a conductor portion. An edge connector portion is positioned along a portion of the body portion. The latching member extends outwardly from an edge of the body portion and retentively engages the plug assembly. Each plug assembly includes a first indentation for receiving body portion, and a second indentation for receiving the rib portion. The plug assemblies also each include a pair of protrusions that are configured to receive an end terminal of a cable that traverses the plug assembly. The body portion and plug assembly are a unitary integrated component. The pair of protrusions is configured to engage the pair of cavities in a connection. Each of the cables forms an electrical connection with the associated cable conductor end terminals when the body portion and the rib portion mate. The latching member is retentively engaged within the first indentation.

It is an advantage of the present invention that it provides a lower-cost termination solution with good alignment, sealing, locking and heat dissipation, and which is accomplished without the use of a tool for making the terminations.

Another advantage of the present invention is that it includes a conventional reliable termination interface having a flat male push-on terminal with a positive latch-locking feature.

A further advantage of the present invention is that it employs a proven termination contact interface with push-on blade terminals.

Yet another advantage of the present invention is an over-molded connector tile assembly having a cable positive latch locking feature, Still another advantage is that the entire connector assembly has a low profile that fits within the limited confines of a roofing tile system.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
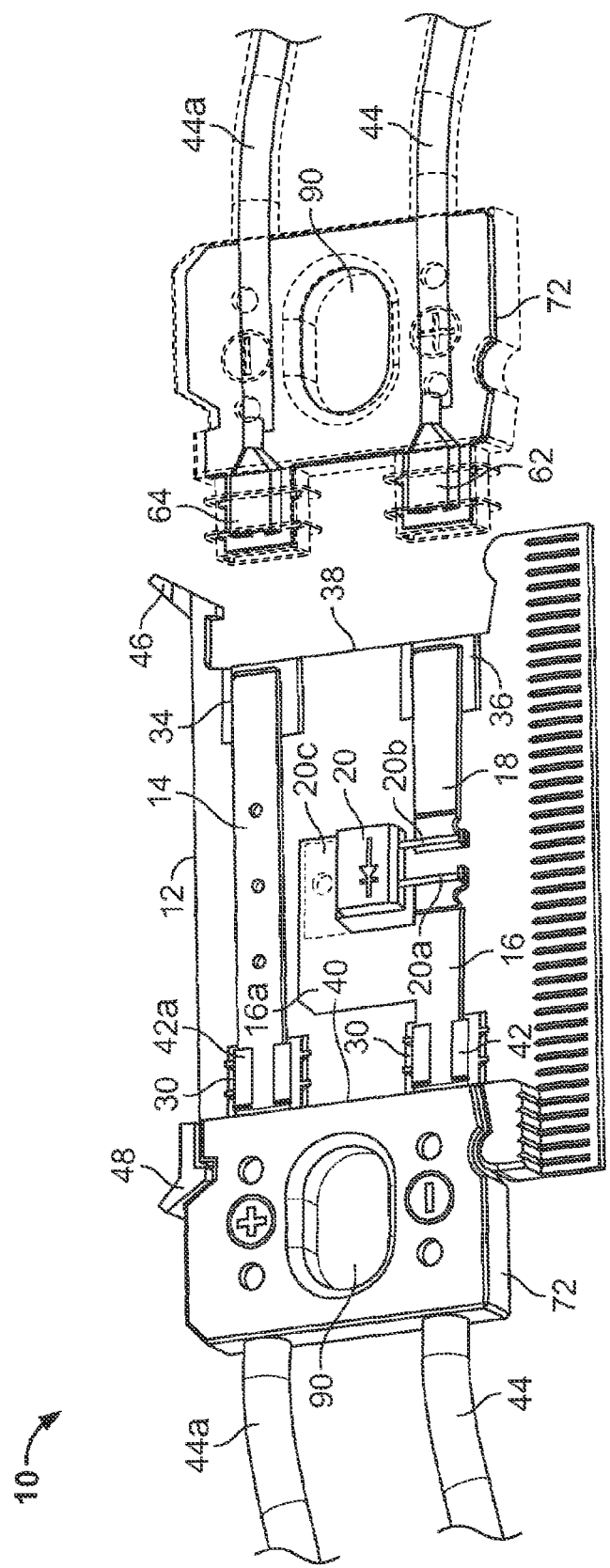
FIG. 1 shows a cross-sectional, partially cut-away view of the connector system of the present invention; the broken lines representing portions of the overmolded connector body and plug assembly, and the solid lines representing internal elements of the connector body and plug assembly.
Figure 2:
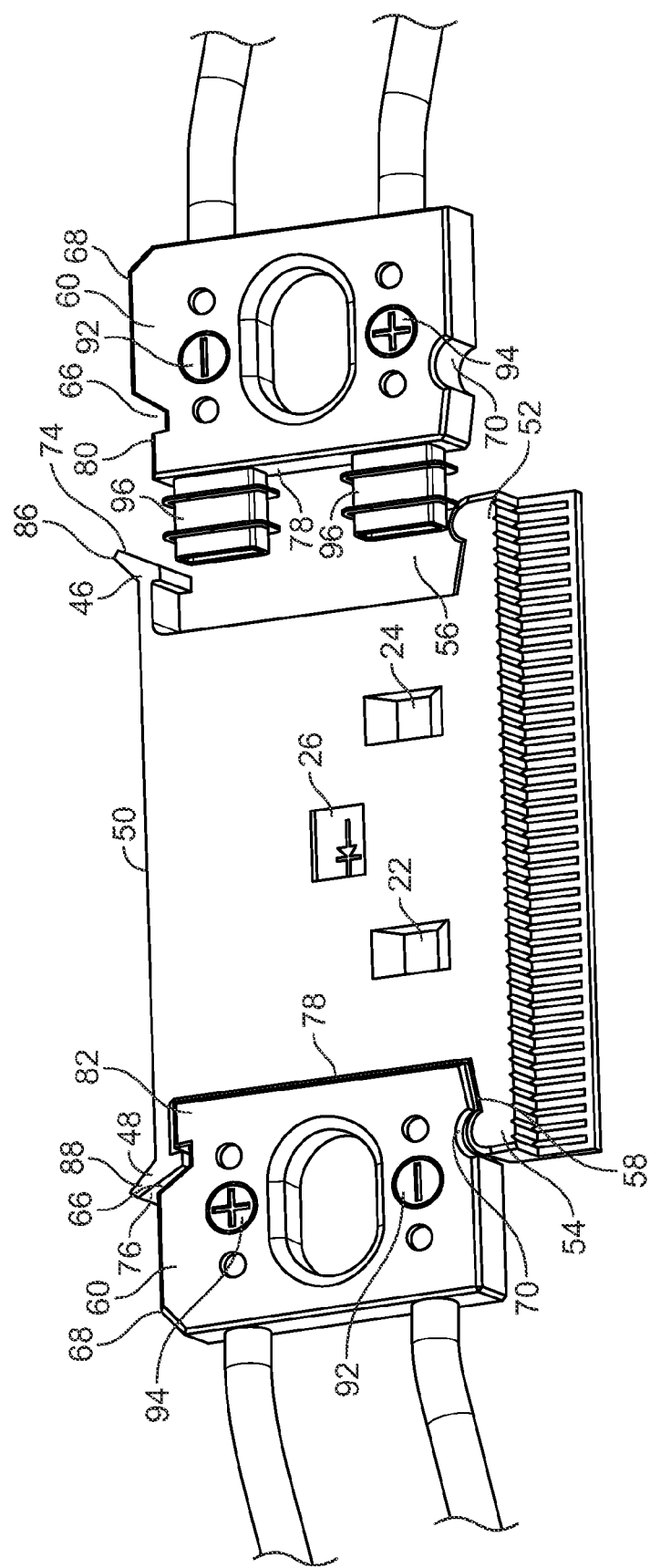
FIG. 2 shows a plan view of the rear or downward facing side of the connector system.

Referring to FIGS. 1 and 2, an electrical interconnection system is generally designated as 10. A connector body 12 houses internal conductor portions 14, 16 and 18, a diode assembly 20, and apertures 22, 24 and 26. Apertures 22, 24 are provided on the back or downward facing side of the connector body 12 to enable soldering tabbing to the PV panel and aperture 26 is provided on the back or downward-facing side of the connector body 12 to provide a vent for the diode for heat dissipation. Preferably, the conductor portions 14, 16 and 18 and diode 20 are insert molded in the connector portion 12. One contact portion 16 or 18 may include an integral flag-shaped portion 16a forming a right angle around the diode 20, for contacting the heat sink 20c of the diode 20. The flag portion 16a provides additional heat dissipation surface with the heat sink 20c.

The conductor portions 14, 16 & 18 extend into recesses 30 and 32, or 34 and 36 at either end 40, 38, respectively, of the connector body 12. The recesses 30, 32, 34 and 36 are arranged to receive female terminal bodies 42, 42a, projecting from a plug assembly 14, in electrical communication with the conductor portions 44, 44a. By way of non-limiting example, the female terminal bodies 42, 42a may be crimp-type terminations such as 250 FASTON® connectors manufactured by Tyco Electronics, Inc., of Middletown, Pa.

The connector body 12 has a pair of latch portions 46, 48 extending from a top edge 50, and a pair of retaining ribs or latches 52, 54 are disposed opposite the latch portions 46, 48. The latch portions 46, 48 and retaining ribs 52, 54, define recesses 56, 58 open at one end for receiving plug assemblies 60. The plug assemblies 60 each include a pair of insulated or over-molded female connector portions 62, 64. The female contact portions 62, 64 fit snugly into recesses 30, 32, 34 and 36 in friction contact with conductor portions 14, 16 and 18. A flexible over molding 96 provides a waterproof seal around the female contact portions 62, 64 when engaged with recesses 30 and 32, or 34 and 36.

Each plug assembly 60 has an indentation 66 along top edge 68 adapted to receive the latch portion 46, 48 of the connector body 12. Also, an indentation 70 in the plug assembly 60 is situated opposite the indentation 66 along bottom edge 72, for receiving the ribs 52 and 54 of the connector body 12. The indentation 66 and indentation 70 of the plug assembly 60 retentively engage the connector body 12 by a snap fit with the latching portions 46, 48 and rib portion 52, 54 respectively. The latching portions 46 or 48 engage the indentation 66 of the plug assemblies 60 by flexing a sloped edge 74, 76 of the latching portions 46, 48, respectively, along a forward edge 78 of the plug assembly 60. The latching portions 46, 48 are formed at the distal ends of extension members 80, 82 of the connector body top edge 50. The extension members 80, 82 are sufficiently resilient to allow the latch portions 46, 48 to deflect the rim portion 84 of sloped edge 74 above the front edge 78, and snap into the indentation 66. At the same time, the extension members 80, 82 are sufficiently rigid to maintain the latch portion 46, 48 within the indentation 66 when significant lateral force is applied—i.e. forcibly pulling on the plug assembly should not disengage the latch portion 46, 48 from the indentation 66. The latch portions 46, 48 have a extension tips 86, 88 that protrude diagonally outward from the surface of the engaged plug assembly 60 and the indentation 66, to allow disengagement of the latch portions 46, 48 from the plug assembly 60. The latch portions 46, 48 flexibly retract from the indentations 60 when pressure is applied to the extension tips 86, 88, for example, by finger manipulation or by a fulcrum force such as a flat screwdriver, a knife edge, etc. The rib portions 52, 54 provide supplemental assurance against unintentional disengagement of the plug assembly 60. By the above-described arrangement, the plug assembly 60 may be retentively engaged with the connector body 12 by a relatively low insertion force by hand. In a preferred embodiment, an aperture 90 is positioned in the approximate center of the plug assembly 60. The aperture 90 is preferably oblong-shaped to permit finger-tip insertion and gripping to apply insertion or removal forces to the plug assembly 60 and connector body 12. The plug assembly 60/connector body 12 configurations thus enable the PV roof tiles 104 (See FIG. 5) to be connected and disconnected by hand—i.e., without the need for a special tool, and preferably without a tool. The force required to engage and/or disengage the plug assembly 60 and connector body 12 is preferably achieved by grasping the two parts by hand and pressing the two together until the latching portion 46 or 48 engages with the indentation 66 of the plug assembly 60

Polarity markings 92, 94 are applied to the over/insert molds of plug assembly 60 and connector body 12, to prevent incorrect connections. Preferably, the polarity markings would be molded in the plug assembly 60 and the connector body 12. As shown in FIG. 1, the polarity markings 92, 94 of the plug assembly 60 appear to be reversed, because the rear surface faces the roofing tile when installed. In addition to the polarity markings 92, 94, the latch portions 70, 66 provide a polarization feature that ensures that the plug assembly 60 is not inserted to the wrong polarity.

Figure 3:
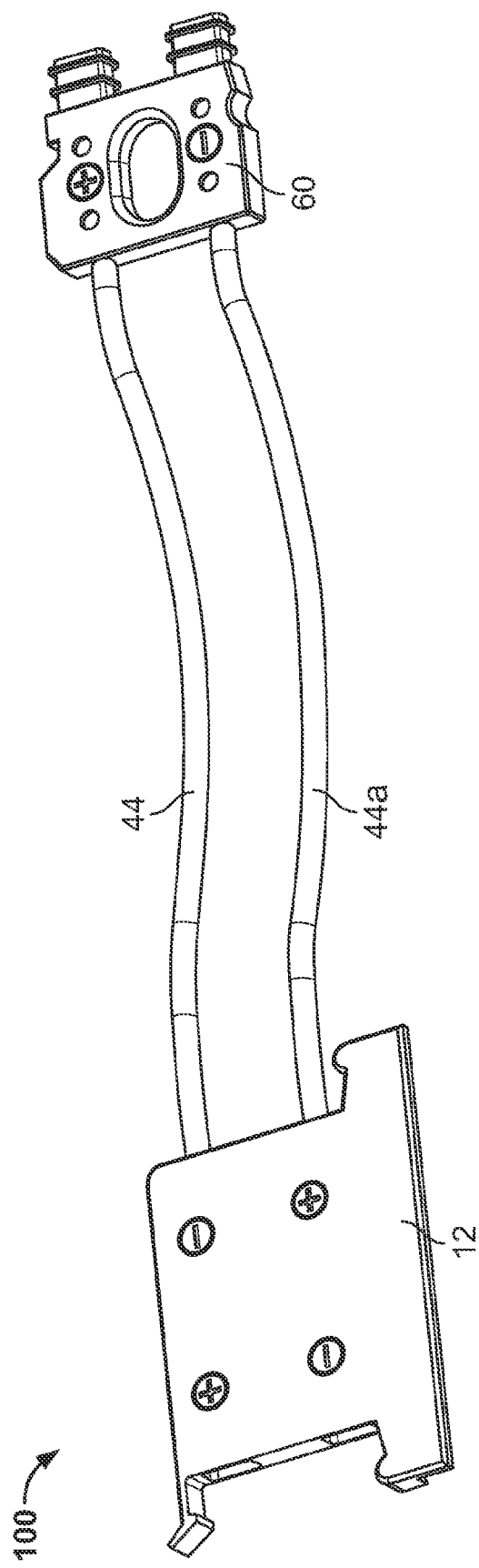
FIG. 3 shows a top view of the plug/connector assembly.
Figure 4:
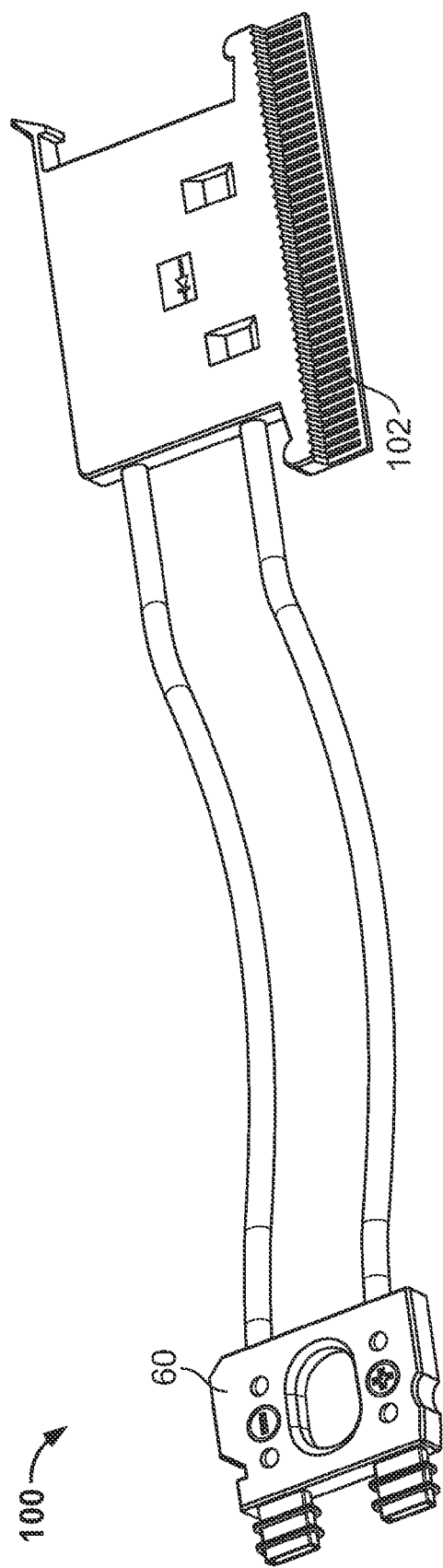
FIG. 4 shows a bottom view of the plug/connector assembly.
Figure 5:
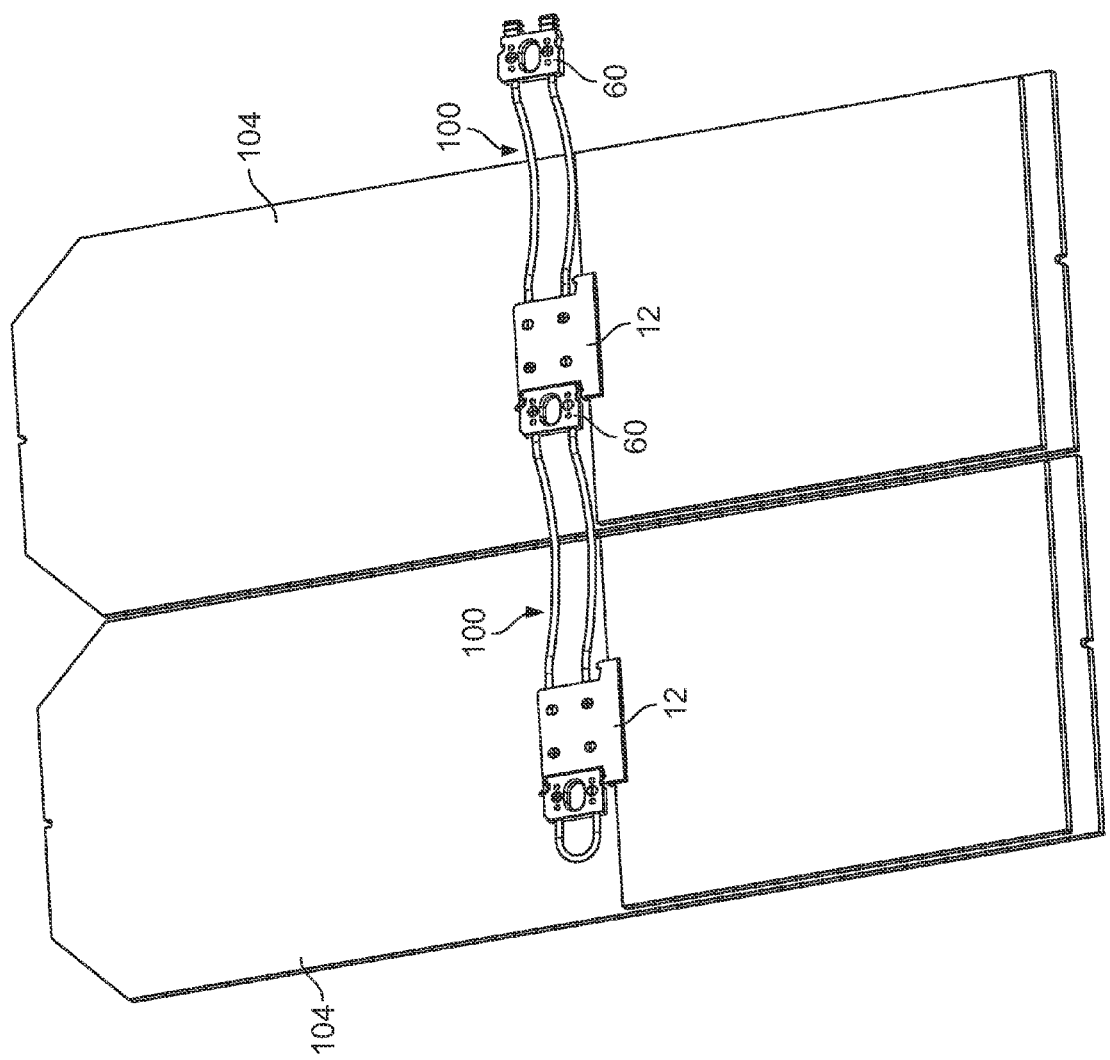
FIG. 5 shows the plug/connector assemblies installed on photovoltaic roofing tiles.

Referring next to FIGS. 3-5, an alternate embodiment of the connection system is shown. A plug/cable assembly 100 is integrated into the connector body 12 that mounts onto roofing tile 104. The plug/cable assembly 100 includes a plug assembly 60 at one end, and a connector body 12, interconnected by conductors 44, 44a. The latching portion 46, 48, recesses 38, 40 and rib portions 52, 54 are provided at one end of the connector body 12 in this configuration, and the conductors 44, 44a are overmolded in contact with the internal conductor portions 14 or 16, and heat sink 16a, by connection techniques such as soldering or crimping.

The connector body 12 has an edge portion 102 that covers the connection between the connector body 12 and the PV roof tile 104 (see FIG. 5). Preferably, the edge portion 102 is constructed of a plastic material, however, any suitable material may be used. The edge portion 102 prevents moisture from penetrating the interface between the PV roof tile 104 and the connector body 12. The PV roof tile 104 is configured to convert solar energy into DC power. The connector portion 12 is preferably constructed by molding a thermally conductive resin, for example PPO (polyphenylene oxide)

Figure 6:
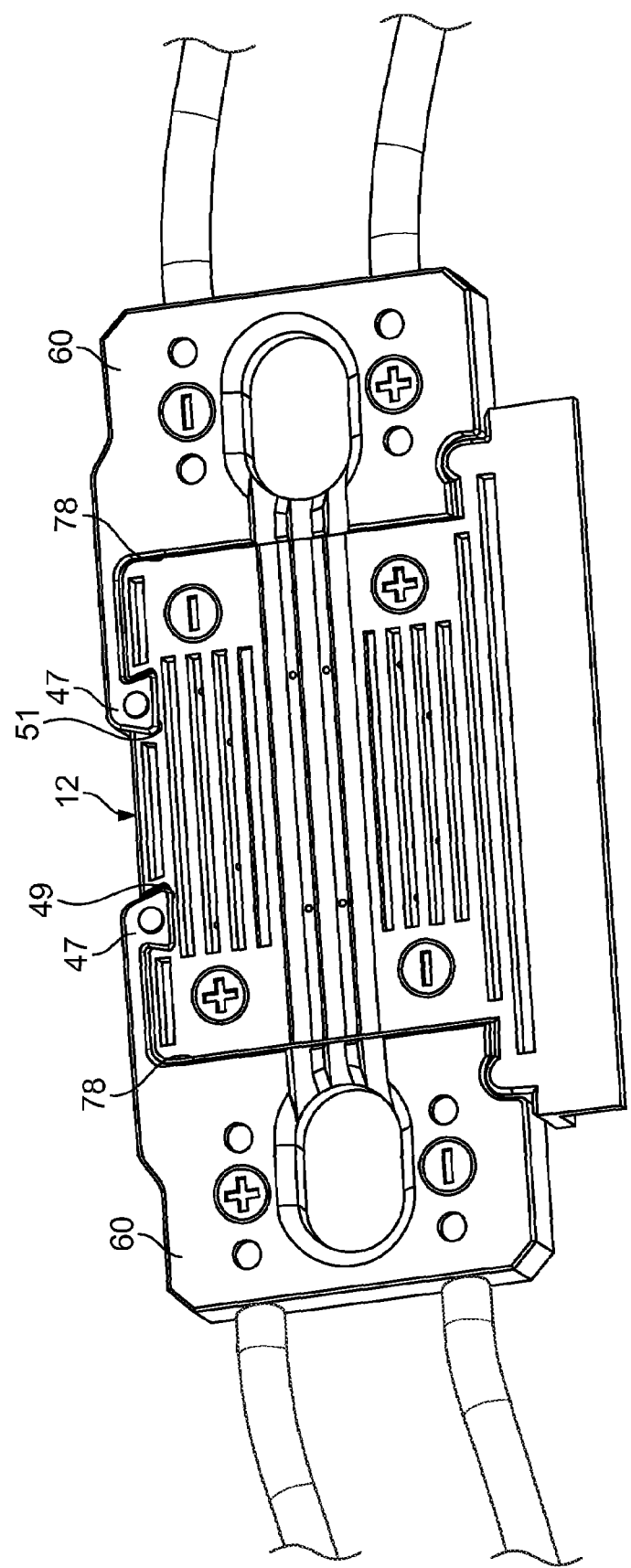
FIG. 6 shows a top perspective view of an alternate embodiment of the plug/connector assembly having latching portions located on the plug assembly.

Referring next to FIG. 6, an alternate embodiment of the present invention is shown, in which the latch portion 47 is provided on the plug assembly 60 and extends outward from the forward edge 78 of the plug assembly 60, as contrasted with the connector body 12 depicted in FIGS. 1 and 2. The connector body 12 includes indentations 49 and 51, which are configured to retentively engage the latch portion 47.

Figure 7:
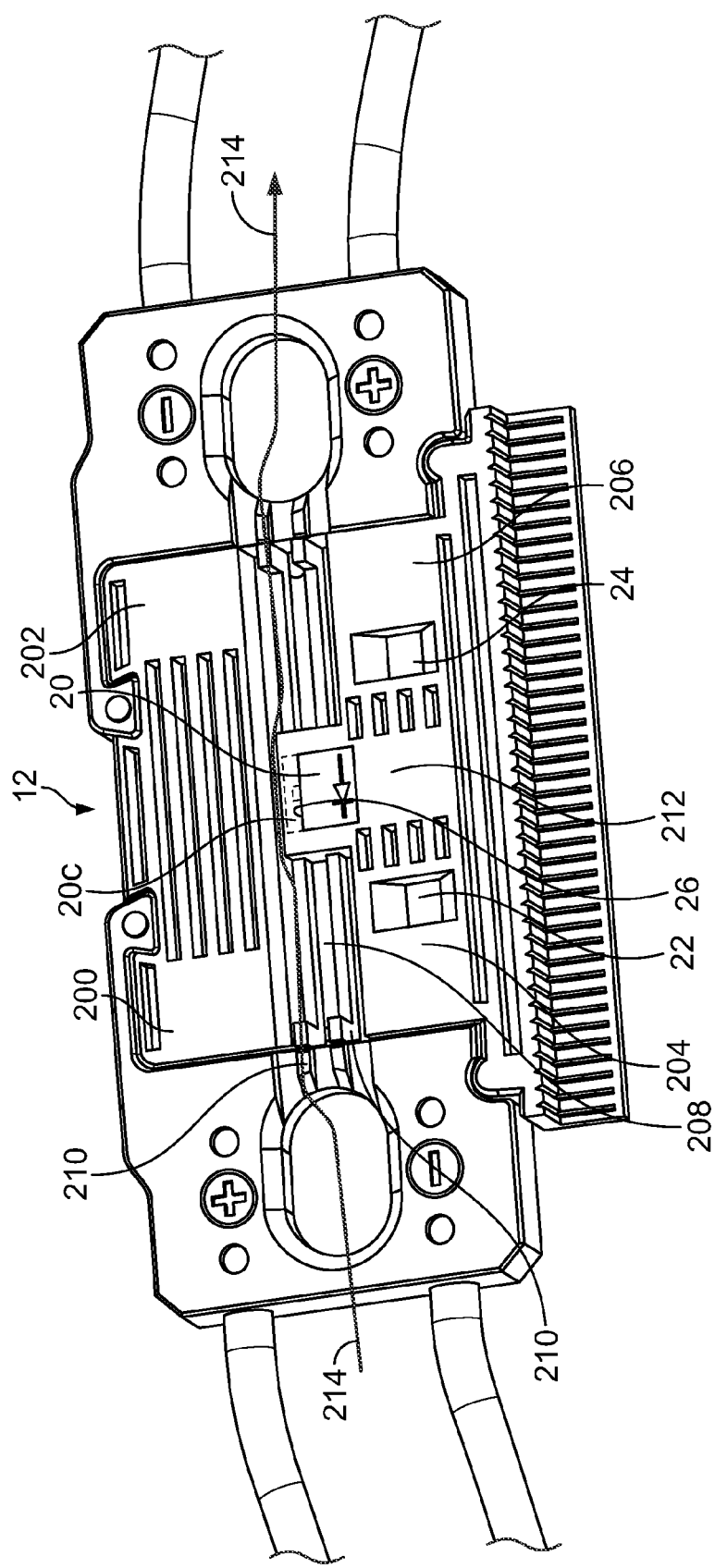
FIG. 7 shows a rear view of the plug/connector assembly of FIG. 6.

Referring to FIG. 7, the underside of the connector body 12 is provided with surfaces 202-206 for application of adhesive, for adhesively attaching the connector body 12 to the roof tile 104 (See FIG. 5). Air channels 208 are located between rails 210 that extend away from the back surface 212 of the connector body 12, creating a flow path indicated by arrow 214, for cooling the metal heat sink In addition, the connector body 12 in FIGS. 6-7 includes the internal elements, such as heat sink 20c, internal conductor portions 14, 16 and 18 (See FIG. 1), a diode assembly 20, and apertures 22, 24 and 26 for soldering of the diode terminals 20a and 20b (See FIG. 1). The heat sink 20c is preferably inserted and integrally molded with the connector body 12, and exposed to air passing through channels 208. Also, the edge portion may preferably have a textured surface for enhanced adhesion to glass surfaces of the PV roof tiles 104.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A connector system for interconnecting electrical elements of a photovoltaic roof tile system comprising:
    a body portion and a plug assembly, said body portion and plug assembly latchingly engageable, and
    the body portion having a latching member, an end portion and a rib defining a recess open at one end, and a pair of cavities extending inwardly from the peripheral end; the latching member extending outwardly from an edge of said body portion; both of the cavities configured to receive a conductor portion formed within the body portion; and a connector portion;
    said plug assembly having a first indentation for receiving the body portion, a second indentation for receiving the rib portion, and a pair of hollow protrusions, each protrusion configured to receive an end terminal of a cable traversing the plug assembly; and
    wherein the pair of protrusions being configured to engage the pair of cavities such that each of the cables forms an electrical connection when the body portion and the rib portion mate, and the latching member is retentively engaged within the first indentation.

2. The system of claim 1 wherein the body portion has a distal end, and a projection formed at the distal end and wherein the plug assembly receives the projection of the distal end.

3. The system of claim 1, wherein the plug assembly disengages by manipulation of the latching member.

4. The system of claim 1, wherein the latching member is flexible.

5. The system of claim 1, wherein the pair of cavities extending inwardly from the peripheral end are female cavities.

6. The system of claim 1, wherein the conductor portion is integrally formed with the body portion.

7. The system of claim 1, wherein the plug assembly having a central aperture for finger insertion to allow gripping the plug assembly.

8. The system of claim 1, further comprising the edge connector portion having a plurality of contact elements, the plurality of contact elements being configured to interconnect the photovoltaic roof tile with the conductor portion.

9. The system of claim 1, further comprising:
    a diode for blocking reverse currents in the photovoltaic roof tile; and
    a heat sink for dissipation of heat from the diode element.

10. The system of claim 1, wherein the body portion having a plurality of windows for securing components to the body portion.

11. The system of claim 1, wherein the protrusions are male protrusions that sealing engage with the female cavities.

12. The system of claim 1, wherein polarity markings are disposed on at least one side of the connector body and the plug assembly.

13. A connector system for interconnecting electrical elements of a photovoltaic roof tile system comprising:
    a body portion and a plug assembly, said body portion and plug assembly latchingly engageable, and
    the body portion having a latching member, an end portion and a recess open at one end, and a pair of cavities extending inwardly from the peripheral end; the latching member extending outwardly from an edge of said body portion; both of the cavities configured to receive a conductor portion formed within the body portion; and a connector portion;
    said plug assembly having a first indentation for receiving the body portion, a second indentation for receiving the rib portion, and a pair of hollow protrusions, each protrusion configured to receive an end terminal of a cable traversing the plug assembly; and
    wherein said body portion and plug assembly being a unitary integrated component, the pair of protrusions being configured to engage the pair of cavities such that each cable forms an electrical connection when the body portion and the rib portion mate, and the latching member is retentively engaged within the first indentation.

14. The system of claim 13, wherein the body portion has a distal end, and a projection formed at the distal end and wherein the plug assembly receives the projection of the distal end.

15. The system of claim 13, wherein the plug assembly disengages by manipulation of the latching member.

16. The system of claim 13, wherein the latching member is flexible.

17. The system of claim 13, wherein the pair of cavities extending inwardly from the peripheral end are female cavities.

18. The system of claim 17, wherein the protrusions are male protrusions that sealing engage with the female cavities.

19. The system of claim 13, wherein the conductor portion is integrally formed with the body portion.

20. The system of claim 13, wherein the body portion is configured with a textured surface for enhanced adhesion to a glass surface of the photovoltaic roof tile.

\* \* \* \* \*